United States Patent
Loeb et al.

(10) Patent No.: US 6,332,124 B1
(45) Date of Patent: Dec. 18, 2001

(54) METHOD AND SYSTEM FOR MANAGING MAGAZINE PORTFOLIOS

(75) Inventors: Michael Loeb, Darien; John Nimons, Redding, both of CT (US)

(73) Assignee: Synapse Group, Inc., Stamford, CT (US)

( * ) Notice: Subject to any disclaimer, the term of this patent is extended or adjusted under 35 U.S.C. 154(b) by 0 days.

(21) Appl. No.: 09/364,772

(22) Filed: Jul. 30, 1999

(51) Int. Cl.[7] .................................................. G06F 17/60
(52) U.S. Cl. ............................. 705/1; 707/101; 707/102
(58) Field of Search .......................... 705/1, 7; 707/100, 707/102, 104, 200, 101

(56) References Cited

U.S. PATENT DOCUMENTS

| | | | |
|---|---|---|---|
| 4,799,156 | 1/1989 | Shavit et al. ........................ | 364/401 |
| 4,992,940 | * 2/1991 | Dworkin ............................. | 705/26 |
| 5,051,914 | * 9/1991 | Sansone et al. .................... | 700/223 |
| 5,168,445 | 12/1992 | Kawashima et al. ............... | 364/403 |
| 5,319,542 | 6/1994 | King, Jr. et al. .................... | 364/401 |
| 5,475,585 | 12/1995 | Bush ................................... | 364/401 |
| 5,483,445 | 1/1996 | Pickering ............................ | 364/406 |
| 5,521,966 | 5/1996 | Friedes et al. ....................... | 379/91 |
| 5,592,375 | 1/1997 | Salmon et al. ........................ | 705/7 |
| 5,907,845 | * 5/1999 | Cox et al. ............................ | 707/102 |
| 6,014,641 | 1/2000 | Loeb et al. ........................... | 705/34 |

FOREIGN PATENT DOCUMENTS 08-129594 * 5/1996 (JP).

OTHER PUBLICATIONS

Linge: "A Multimedia Architecture Facilitaing Interactive Customer Services"; 18th Biennial Symposium on Communications. Symposium Proceedings, Jun. 2–5 1996, pp. 301–304.(Abstract Only).*

William H. Huff, "Serial Subscription Agencies", Library Trends, Apr. 1976, vol. 24, No. 4, pp. 683–709.

Jennifer Howland, "National Distributors: Scanning the Future", Folio Magazine, Feb. 1985, p. 69.

Wally Wood, "Circulation Marketing: Let Your Magazine do the Selling", Folio Magazine, Jun. 1985, p. 78.

Folio: The Magazine for Magazine Management, "Titles Turn to Credit Card Billing", Jan. 1, 1991, vol. 20, No. 1, ISSN: 0046–4333, pp. 21.

Scott Donaton, "Magazines Set to Test Automatic Renewals", Advertising Age, Jan. 7, 1991, News Section, p. 6.

Echo Montgomery Garret, "Playing the Trump Card . . . ", Folio's Publishing News, Jan. 15, 1991, vol. 3, No. 1, ISSN: 1043–8688, p. 29.

John Masterton, "Titles Turn to Credit Card Billing to Boost Renewals; Circulation", Direct, Feb. 1991, vol. 3, No. 2, ISSN: 1046–4174, p. 16.

Elliott King, "Magazines Test 'Till Forbid' Programs; Automatic Renewals; Circulation Insider", Target Marketing, Feb. 1991, vol. 14, No. 2, ISSN: 0889–5333, p. C2.

Tony Silber, "No Automatic Acceptance for Autorenew; Periodical Subscription; Update", Folio the Magazine for Magazine Management, May 1, 1991, vol. 20, No. 5, ISSN: 00046–4333, p. 13.

(List continued on next page.)

Primary Examiner—Edward R. Cosimano

(57) ABSTRACT

A method and system for organizing magazine subscription information. The method including collecting subscription information from one or more fulfillment houses and organizing or associating the subscription information by household. In one embodiment, the subscription information organized by household is made available to a consumer of a particular household so that the consumer may make changes to all subscription information associated with the household. In one embodiment, the consumer associates a credit card or other account with the household subscription information; the account is charged as payment for the household subscriptions.

25 Claims, 14 Drawing Sheets

OTHER PUBLICATIONS

John Motavalli, "Amex Merger Talks Near End; American Express Publishing Co.", Inside Media, Nov. 20, 1991, ISSN; 1046–5316, p. 1.

John Motavalli, "Time and Amex Discuss Merging Titles; Time Inc. Magazine Co., American Express Publishing Corp.", Inside Media, Feb. 5, 1992, ISSN: 1046–5316, p. 5.

Scott Donaton, "Amex will Revamp 2 Books; Talks on with Time Warner", Advertising Age, Feb. 17, 1992, News Section, p. 54.

Fred Pfaff et al., "Amex Shuffles Magazine Group; American Express Publishing Corp.", Inside Media, Mar. 4, 1992, ISSN: 1046–5316, p. 1.

John Motavalli, "Time Warner—Amex Talks at 'Highest Levels'; Possible Deal Would Bring Travel & Leisure and Food & Wine to Time Inc.; American Express Publishing Corp.", Inside Media, Apr. 29, 1992, ISSN: 1046–5316, p. 22.

Karen Burka, "Time, Amex Close in on Join Venture; Time Inc.; American Express Publishing Corp.", Direct Magazine, Jan. 1993, vol. 5, No. 1, ISSN: 1046–4174, p. 11.

John Motavalli, "Chuckling at Rumors . . . ", Inside Media, Jan. 20, 1993, ISSN: 1046–5316, p. 28.

William Smith, "Can Atlanta's Premier Magazine About Culture, Food, Entertainment, Food, Celebrities, Food, Fashion, Food, Politics and Food Make it on a Greatly Slimmed Down Budget?", Georgia Trend, Sep. 1993, vol. 9, No. 1, Sec. 1, p. 52.

Karen Burka, "Time Warner's New Slant on Magazine Subs", Direct, Jan. 1994, vol. 6, No. 1, p. 12, ISSN: 1046–4174, p. 12.

Eric Bryant, Make the Library Connection:, The Magazine for Magazine Management, Mar. 1, 1994, vol. 23, No. 4, pp. 33–34.

Pamela Cibbarelli, "Cibbarelli's Surveys: User Ratings of Library Subscription Services", Computers in Libraries, Jun. 1995, vol. 15, No. 6, ISSN: 1041–7915, pp. 29–34.

Cris Beam, "New Hope for Autorenewals, Automatic Magazine Subscription Renewals", Folio: The Magazine for Magazine Management, Aug. 1, 1996, vol. 25, No. 11, IISN: 0046–4333, p. 24.

Publishers Clearinghouse On–Line Magazine Ordering Entitled "Deal of the Day", Dated Thursday, Mar. 6, 1997, (.pch.com), 8 pp.

Folio; Publishing News, "Magazines Report Poor Results in Renewal Service's Tests; Autorenew Automatic Subscription Renewal Service," Apr. 1992, vol. 4, No. 4, p. 10, ISSN: 1043–8688.

Advertising Age, "Automatic Renewal Test at Conde Nast," Feb. 3, 1992, p. 10.

Folio's Publishing News, Feb. 15, 1991, "Life After the Numbers Game, A Radical Rethinking of Circulation Economics and Strategies is Unavoidable, Says MPA'S Bob Cohn; Magazine Publishers of America; Newsmaker; Interview", vol. 3, No. 2, p. 27; ISSN: 10443–8688.

Folio: The Magazine for Magazine for Magazine Management, "Automatic Renewals: 10 Tips From the Front Lines; Periodicals; Brief Article", Nov. 1, 1996, vol. 25, No. 16, ISSN: 0046–4333, p. 9.

Paula Squires, "Even Death May not Stop your Reader's Digest Subscription", The Richmond Times Dispatch, Mar. 16, 1997.

David N. Rosen, "A Great Idea Comes of Age. Autorenewal lets you cut Mailing Efforts and improve Subscriber Retention; Periodical Publishing", Folio Magazine, Feb. 1, 1998, vol. 27, No. 2, ISSN: 0046–4333, p. 37.

* cited by examiner

| SUBSCRIPTION NO. | HOUSEHOLD ID | LINK | CONSUMER NAME | CONSUMER ADDRESS | MAGAZINE ID | CURRENT AMOUNT | FUTURE AMOUNT | EXP. DATE | CHANNEL OF SALE | ORIGINATION DATE |
|---|---|---|---|---|---|---|---|---|---|---|
| 0000 0001 | 0000 0001 | YES | SANDRA SMITH | 123 MAIN ST. APT. 2D BROOKLYN, NY | TIM 247 | 36 | 36 | 10/08/99 | TCS | 10/08/98 |
| . . | | | | | | | | | | |
| ABEF 0016 | 0000 0001 | NO | DICK SMITH | 123 MAIN ST. APT. 2D BROOKLYN, NY | PCM 125 | 12 | 12 | 10/02/00 | CDS | 10/02/95 |
| . . | | | | | | | | | | |
| FFFF FFFF | 0000 0001 | YES | SANDRA SMITH | 123 MAIN ST. APT. 2D BROOKLYN, NY | SPI 126 | 24 | 24 | 04/15/00 | CENTROBE | 04/15/99 |

FIG. 3B

| ADD-ON NO. | HOUSEHOLD ID | CONSUMER NAME | CONSUMER ADDRESS | MAGAZINE ID | EXPIRATION DATE |
|---|---|---|---|---|---|
| 0000 0001 | 0000 0001 | SANDRA SMITH | 123 MAIN ST. APT. 2D BROOKLYN, NY | MHM 123 | 10/31/00 |
| . | | | | | |
| . | | | | | |

FIG. 3C

| PUBLISHER (1) | FULFILLMENT HOUSE (1) | PUBLISHER (2) | FULFILLMENT HOUSE (2) |
|---|---|---|---|
| TIME, INC. 5 PARK AVE NY, NY | TCS | ZIFF-DAVIS, INC. 1234 6th AVE NY, NY | CDS |

| MAGAZINE ID (1) | MAGAZINE TITLE (1) | MAGAZINE ID (2) | MAGAZINE TITLE (2) | MAGAZINE ID (3) | MAGAZINE TITLE (3) |
|---|---|---|---|---|---|
| TIM 247 | TIME | TIM 357 | TIME | SPI 126 | SPORTS ILLUSTRATED |

| TERM | HALF BASIC RATE |
|---|---|
| 12 | 20 |

FIG. 3D

METHOD AND SYSTEM FOR MANAGING MAGAZINE PORTFOLIOS

FIELD OF THE INVENTION

The present invention relates generally to enabling a consumer to service multiple magazine subscriptions previously purchased through different publishers and sources and, more particularly, to a method and a system of automatically organizing subscriptions and subscription information by household.

DESCRIPTION OF THE RELATED ART

The magazine industry is old (200 years and counting), diversified and large. The industry will generate roughly $25 billion in sales this year from the sale of advertising, single copies on the newsstand and subscription sales. This year, Americans will purchase over 300,000,000 subscriptions and spend $8 billion to buy them. Using the broadest of measures, there are over 3,000 magazines published, although only about 600 are tracked by trade organizations such as the Audit Bureau of Circulations (ABC).

The industry is diffuse in other ways too, such as the ways it sells and services subscriptions. Subscription services are typically outsourced to third party subscription providers who warehouse subscriber (i.e., consumer) names; manufacture mailing labels; print, mail and process renewal notices and bills; and provide consumer service.

Similarly, publishers often outsource subscription marketing. Today 60% of all new subscriptions are provided by third party marketers known in the trade as subscription agents or "agents". Typically, the agent is allowed only to sell the initial subscription and is required to "turn over" the consumer to the publisher for renewal. It is also the trade practice to require the seller to handle related consumer care. Thus, were a consumer to Time Magazine, who bought her subscription through Publisher Clearing House (PCH), to direct a service complaint to the publisher—Time, Inc. (Time), Time would likely refuse service to that individual and instead refer that consumer back to the subscription provider. While the remedy appears draconian, the rationale is grounded in logic. Time does not share subscription data with PCH; does not have a system link to PCH; and PCH, for its part, returns the courtesy and shares only essential subscription data.

This is not the only area where the magazine industry under-serves the consumer. Magazines will mail 7, 10, even 15 renewal notices and place phone calls starting only weeks after someone subscribed and not ending until months after the subscription was cut to badger consumers into renewing. They will also send multiple dunning notices to pester consumers to pay for the renewal bought on credit. The refusal to service consumers and the oppressive renewal and billing process results in an enormous inconvenience for consumers in managing their portfolio of magazines.

On average, each American household enjoys three subscriptions to Time, Sports Illustrated, National Geographic or to any one of hundreds of other well-known magazine brands. But like any product, consumption follows a bellshaped curve. Only 20% of American homes subscribe to no magazines, but over 10 million subscribe to 7 or more. When we multiply all the foregoing renewal notices and bills by the average number of subscriptions, the average American home receives over 30 reminders annually from publishers. Heavy readers can receive more than 100!

The renewal and billing process creates more confusion for the consumer. It has a significant effect on their magazine experience. Renewals and bills are mailed at such a furious pace that consumer responses and publisher solicitations will cross in the mail even if consumers respond the first day they get a renewal notice. It is not unusual for a consumer to discover that he paid for a subscription years into the future. What if consumers wanted to reduce their subscriptions or correct an overpayment? They would have a difficult time fixing it. Call the publisher? Publishers publish everything but their phone number. Call the publishers' outsourced service bureaus? Only if you bought the subscription directly from the publisher. If the consumer purchased one of the tens of millions of subscriptions that are bought each year from a subscription agent, the service bureau would refuse to serve the consumer.

The "system", as it exists today, is oppressive and confusing for the consumer. The return rate in the publishing industry is abysmally high—a tribute not to the quality of their products but the malignance of their marketing proposition. The "system" is also much more costly than it needs to be. On a net renewal subscription basis, publishers spend roughly 30% of what they collect on retention promotions. That is many, many times higher than for credit cards, cable television, home delivered newspapers, or online services.

The Audit Bureau of Circulations (ABC) serves as the magazine industry "referee", counting the magazine sales that count toward a publisher's rate base. A publisher's advertising revenue is based on its rate base. A sale or renewal qualifies to be counted toward a publisher's rate base if the dollar amount committed from the consumer exceeds half of the publisher's established price known as the basic rate. Thus, for every sale above the half basic rate, a publisher benefits as that subscription is counted towards the rate base.

Purchases above the half basic rate can also benefit the consumer. As established by ABC, dollars committed by a consumer in excess of the half basic rate in a qualifying multiple-subscription purchase can be applied to one or more additional subscriptions at no extra cost. For example, if a consumer pays full basic rate for two subscriptions (e.g., $30 each or $60 total), then the consumer is entitled to an additional subscription having a half basic rate equal to that of the paid subscription to a maximum of amount paid in excess of the collective half basic rate (e.g., $30). Thus amount in excess of the half basic rate is applied to meeting the half basic rate of the additional subscription. Because ABC views a multiple subscription purchase or renewal as a single event, when a consumer purchases multiple subscriptions, the amount in excess of the half basic rate for each subscription may be aggregated and applied to one or more additional subscriptions. In the magazine industry vernacular, such additional, subscriptions available at no extra cost are known as "add-ons".

While add-ons provide some level of an incentive for consumers to purchase subscriptions, add-ons are not broadly available. Because a consumer purchases and renews subscriptions through many different sources, the consumer is often unable to accumulate in a single event enough dollars in excess of the half basic rate to qualify for an add-on. Additionally, consumers typically do not know they are entitled to add-ons and, therefore, do not press for them. Consequently, a need also exists for an improved method and system for providing consumers with the incentive to purchase and renew subscriptions.

SUMMARY OF THE INVENTION

The present invention satisfies the foregoing needs. In one embodiment of the present invention, magazine subscription information is collected from one or more fulfillment houses. The collected subscription information is organized or associated together by household. In another embodiment, the organized subscription information is made available to a consumer of a particular household so that the consumer may make changes to all subscription information associated with the household. In yet another embodiment, the consumer associates a credit card or other account with the household subscription information, and the account is charged for the household subscriptions.

BRIEF DESCRIPTION OF THE DRAWINGS

The following drawings illustrate certain preferred embodiments of the present invention and constitute part of the specification.

FIGS. 3A–3D illustrate the household database, subscription database, add-on database, and magazine database of one embodiment of the present invention.

DETAILED DESCRIPTION OF PREFERRED EMBODIMENTS

One embodiment of the present invention is designed to end all this consumer confusion and publisher expense by replacing the existing cobbled-together network at hundreds of insourced and outsourced service providers (each with unique rules and standards) with a universal system that is marked by ease of use, a superior consumer experience, greater cost effectiveness and a singular service standard. According to one embodiment of the present invention, consumers will go to a database accessible through a website, and look up their entire current subscription portfolio and relevant subscription data including expiration date and amount paid. They will also be able to convert their entire portfolio to a single credit card, and have their card billed, one magazine at a time, on an expire-appropriate basis. And they can solve the most common customer service problems themselves: change their address (once—for all magazines); cancel; add new subscriptions; give magazines as gifts and even write a letter to the editor. In essence, the present invention can serve as a "magazine manager" for all subscriptions in a household.

In addition to the added convenience, reduced confusion and the elimination of the "crossed-in-the-mail" problem, the present invention would be attractive to consumers because of various other incentives apparent from the following description.

Figure 1:
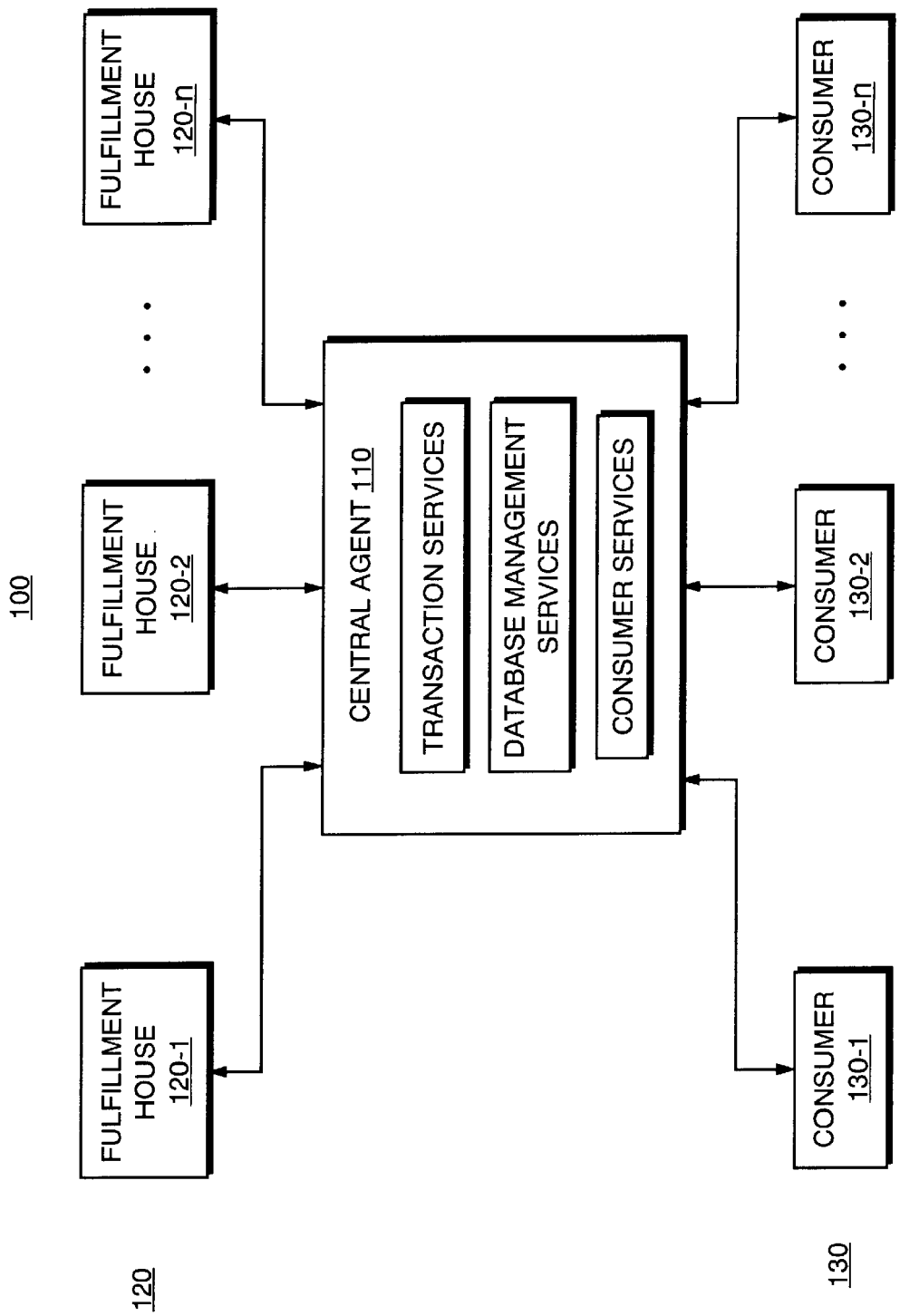
FIG. 1 is an overall schematic of one embodiment of the present invention.

Certain embodiments of the present invention will now be described with reference to the figures. A schematic of one system 100 according to one embodiment of the present invention is shown in FIG. 1. In general, the system 100 includes a central agent 110 coupled to a plurality of fulfillment houses 120 (fulfillment house 120-1 being the first of the plurality, fulfillment house 120-2 being the second of the plurality and fulfillment house 120-N being the Nth of the plurality) and a plurality of consumers 130 (consumer 130-1 being the first consumer of the plurality, consumer 130-2 being the second consumer of the plurality and consumer 130-N being the Nth consumer of the plurality). In the present embodiment, the central agent 110 is coupled to the Internet (worldwide web) over which communication is made with the consumers 130. More specifically, the central agent 110 provides a web site through which it offers to the consumers 130 the various services described herein. Thus, each consumer 130 has a consumer interface device, such as a personal computer, set-top box, portable device, or the like to access the web.

Each of a plurality of fulfillment houses 120 is also coupled to the central agent 110. In the present embodiment, these connections are made via a network, such as a File Transfer Protocol (FTP) wide area network (WAN). In an alternate embodiment, however, the connection with each fulfillment house may be over any of a number of communication paths including over the Internet, via a public switched telephone network and the like.

As will be described in detail below, the central agent 110 receives "vertically" stored subscription information from the fulfillment houses 120, filters and reorganizes the subscription information "horizontally", across all magazines by household, effectuates the billing and fulfillment of consumers' subscriptions and interacts with the consumers 130 to provide consumer services (e.g., to answer queries and update consumer records). In general, the central agent 110 provides database management services, which includes filtering subscription information and reorganizing the subscription information horizontally by household, transaction services, which include effectuating the billing and fulfillment of individual subscriptions, and consumer services, which includes answering inquiries and updating subscription and consumer information.

Figure 2:
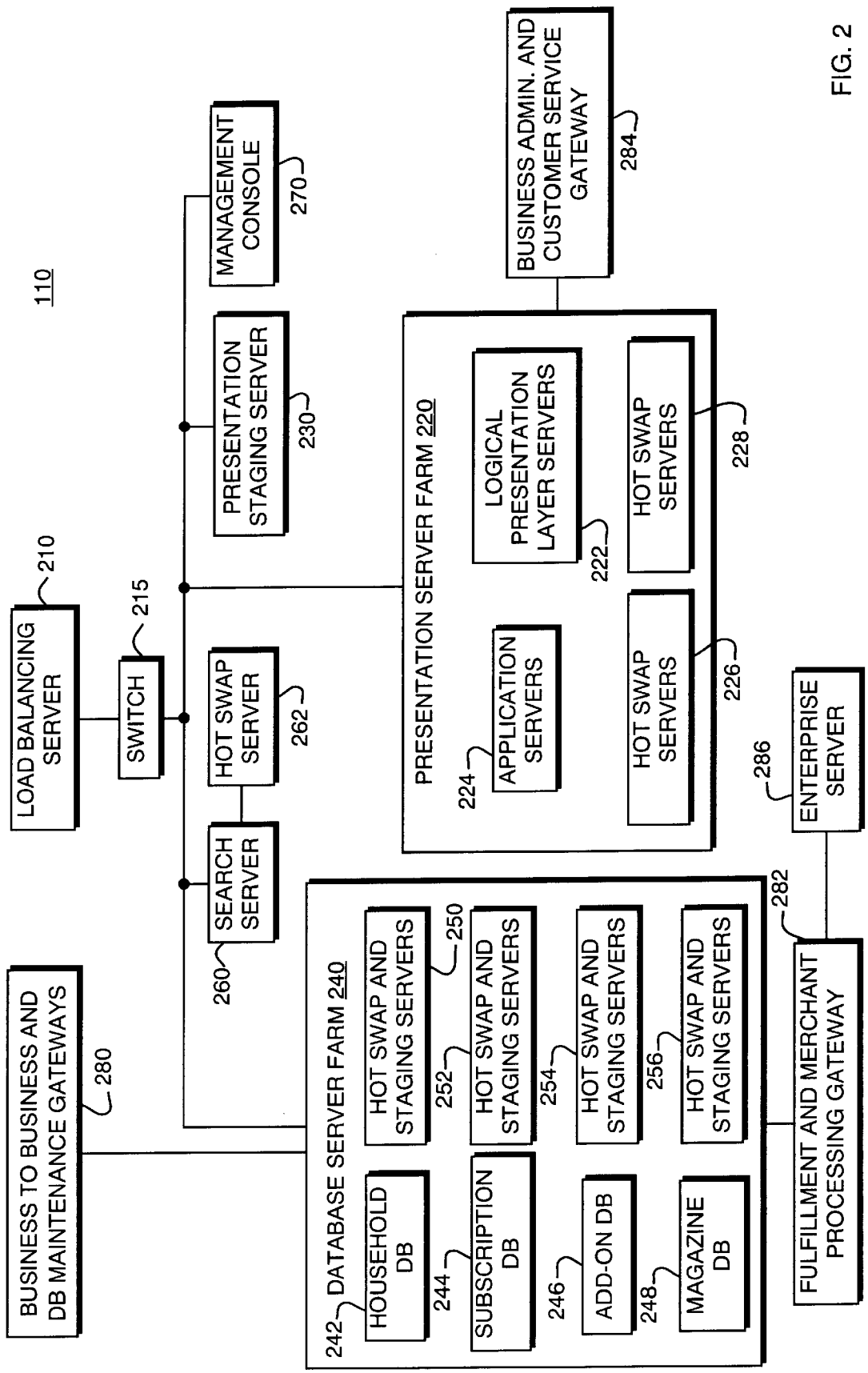
FIG. 2 is a schematic of the central agent of one embodiment of the present invention.

A more detailed schematic of the central agent 110 will now be described with reference to FIG. 2. In general, the central agent 110 comprises a three tier or layered structure. The first layer is a logical presentation layer, which provides the graphical user interface (GUI) of the web site through which each consumer interfaces with the central agent 110. The second layer is the application layer, which provides support logic for the GUI and establishes the business rules that dictate the operation of the system. The third layer is the database management layer, which interacts with the application layer to retrieve, modify, and store information. In addition to these three layers, the central agent 110 also includes an optimizing search server 260 and a management console 270.

Other optional components of the central agent 110 include a load balancing server 210 and a switch 215. The load balancing server 210 distributes web hits over the architecture of the central agent 110 via the switch 215. In other words, the load balancing server 210 monitors the architecture to determine what components are relatively busy and directs traffic away from those components.

The central agent 110 also includes a presentation server farm 220. The presentation server farm 220 contains the servers that provide the functionality associated with the first and second layers of the architecture namely, the logical presentation layer and the application layer. Specifically, the presentation server farm 220 includes logical presentation servers 222 that are programmed to provide the GUI resident on the we page accessed by the consumers 130. Also part of the presentation server farm 220 are the application servers 224. The application servers 224 provide the support and logic for the GUI created by the logical presentation servers 222. As noted above, the application servers 224 also provide the business rules that govern the operation of the central agent 110. Such operation will be discussed in detail below with references to FIGS. 4A–4C, 5, 6A–6B and 7.

In one embodiment of the invention, the presentation server farm 220 also includes hot swap servers 226, 228 for both the logical presentation servers 222 and application servers 224, respectively. Such hot swap servers provide redundancy and allow for continued availability in the event of a component failure.

Related to the presentation server farm 220 is the presentation staging server 230. The presentation staging server 230 provides temporary functionality of the presentation server farm 220 during the period the presentation server farm 220 (and/or the software residing on the servers) is being upgraded. The presentation staging server 230 allows the migration of the logical presentation and application layers software.

The architecture of the central agent 110 also includes a database server farm 240, which provides the functionality for the database maintenance layer. Specifically, the database server farm 240 includes household database 242, subscription database 244, add-on database 246, and a magazine database 248. In the present embodiment, a separate server accesses each database, although in an alternate embodiment, a single server may access more than one database. Like the presentation server farm 220, the database server farm 240 includes a series of hot swap and staging servers 250, 252, 254, 256, one for each of the databases.

As described in detail below, the household database 242 organizes subscriptions horizontally, by household; the subscription database 244 contains magazine subscription information; the add-on database 246 temporarily stores add-on subscription information; and the magazine database 248 stores magazine information defining each possible subscription. The fields of each database and the purpose of each will be discussed in greater detail below.

The central agent 110 also includes an optional search server 260 and corresponding hot swap server 262. The search server 260 is coupled to the database server farm 240 to optimize the search capability of the central agent 110. More specifically, the presentation server farm 220 controls the search server 260, which in turn, locally stores information from the databases 242, 244, 246, 248, as needed and performs the necessary searches of information. Like the other hot swap servers, the search hot swap server 262 provides redundancy should the search server 260 fail.

The central agent 110 also includes a management console 270 for monitoring the architecture. The management console 270, which in the present embodiment takes the form of one or more NT workstations, monitors architecture performance, web traffic component loads, and overall network load. The management console 270 also performs the function of failure detection and switching to a hot swap or staging server.

The central agent 110 also includes three gateways or links: a business to business and database maintenance gateway 280, a fulfillment and merchant processing gateway 282, and a business administration and customer service gateway 284. As will become apparent to those skilled in the art based upon the following description, these gateways are communication links to other devices.

The business to business and database maintenance gateway 280 is a link to the fulfillment houses 120. In the present embodiment, this gateway 280 is in the form of a file transfer protocol (FTP) wide area network (WAN), although in alternate embodiments it may take the form of any network or other communication link, such as a public switched telephone network and modem. In the simplest embodiment, the business to business and database maintenance gateway 280 is not an electronic communication link, but rather a terminal through which the gathered necessary information is manually entered. As described below, a business to business and database gateway 280 provides communication with the fulfillment houses 120 for the purposes of receiving subscription information from the fulfillment houses 120 and transmitting a service information to the fulfillment houses 120.

The fulfillment and merchant processing gateway 282 is also coupled to the database server farm 240. This gateway 282 provides communication to an enterprise server 286. More specifically, a central agent 110 communicates via the fulfillment and merchant processing gateway 282 with the enterprise server 286 for the purpose of fulfilling orders and effectuating billing. It is to be understood that the enterprise server 286 is not limited to any particular server, but rather may take the form of any commercially available server.

The central agent 110 also includes the business administration and customer service gateway 284. Coupled to the presentation server farm 220, this gateway 284 provides a link to the customer service and data management group of the central agent 110. More specifically, the business administration and customer service gateway 284 is linked to customer service employees who receive customer inquiries, either by way of the website, e-mail, or telephone and have access to the website and consumer accounts via the business administration and service gateway 284 and presentation server farm 220. In the one embodiment, the consumer service employees have terminals coupled in the form of password protected webbased access.

Having described the overall architecture of the central agent 110, the details of each database will now be described in greater detail with reference to FIGS. 3A–3D. It is to be understood that the following descriptions of the databases are merely representative of one logical arrangement of the information contained therein. Accordingly, as used herein, to say that information is organized in a particular manner does not necessitate a particular physical arrangement but neither a particular logical association. Alternate embodiments of the present invention include different arrangements of the information. For example, the same information may be contained in fewer or more databases. It is also to be understood that the information shown as being contained in any particular field is illustrative; for example, the information shown as being contained within the consumer field of the household database 242 may actually be comprised of several more specific fields (e.g., first name, surname, street address, apartment number, city, state, zip code, etc.).

Figure 3A:
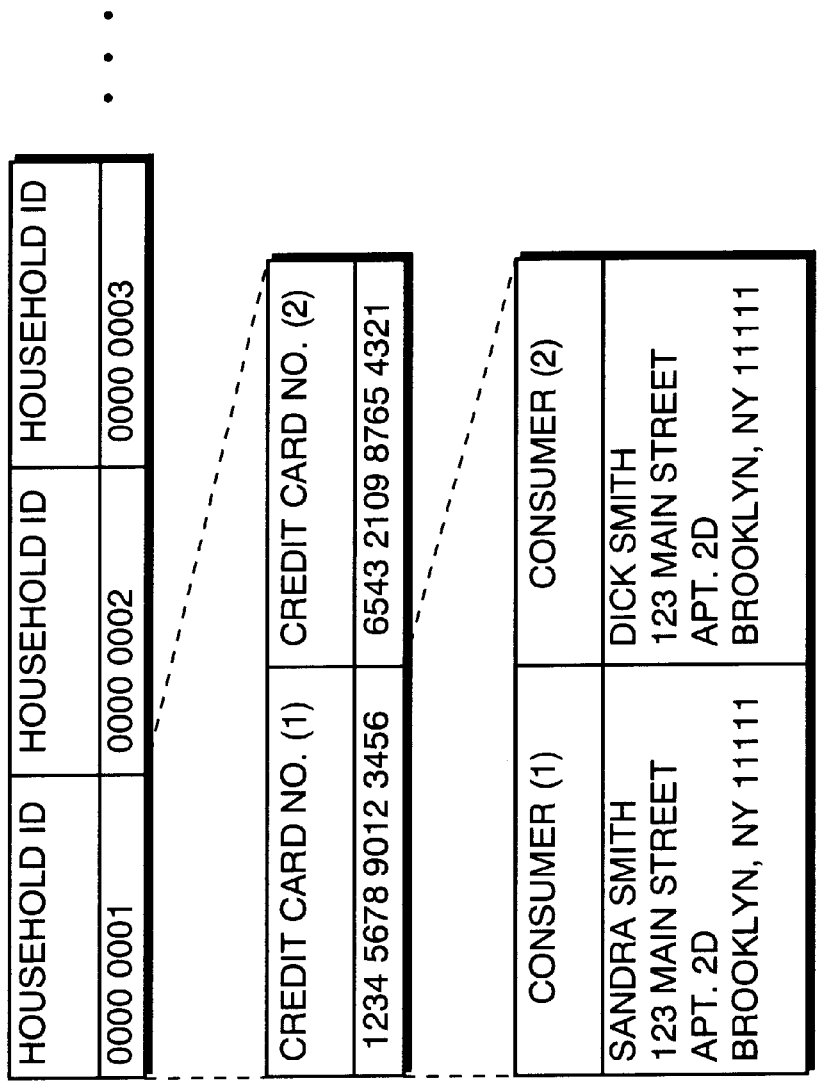

Turning first to FIG. 3A, the three-level structure of the household database 242 is shown. The first level in the household database 242 is the household identifier (ID). As described in detail below, the household identifier, as the name implies, is a random number that identifies each household. Each household ID corresponds to one or more credit card numbers the second level of the household database 242. Each credit card number, in turn, corresponds to one or more consumers, shown as the third level of the database 242.

Thus, to summarize the household database 242, the household identified by household ID 0000 0001 has two credit card numbers on file. The first credit card number, 1234 5678 9012 3456, corresponds to two consumers-- Sandra Smith and Dick Smith. As shown by the same address in the consumer field, both consumers are indeed part of the same household.

The subscription database 244 is shown in FIG. 3B. In general the subscription database 244 contains the subscription information received from the fulfillment houses 120. More specifically, each subscription is assigned a subscription number. The subscription information includes consumer name, consumer address, magazine ID, current amount charged for the subscription, future amount charged for the subscription, expiration date of the subscription, channel of sale of the subscription, and the origination date of the subscription. The purpose of these field will be described below. In the present embodiment, all of the subscription information is obtained from the fulfillment houses 120 via the business to business and database maintenance gateway 280.

Each record in the subscription database 244 also includes a household ID field and a link field. The value in the household ID field indicates that the subscription in a certain record has been assigned to the specified household, and the link field indicates whether or not a consumer has linked a particular subscription to her account.

The add-on database 246 will now be described with reference to FIG. 3C. Each record in the add-on database 246 stores subscription information corresponding to a single awarded add-on subscription identified by an add-on number. As such, the add-on database 246 includes the following fields: consumer name, consumer address, magazine ID and expiration date.

The magazine database 248 will now be described with reference to FIG. 3D. The magazine database 248 is best described as a three level database. The first level of the database includes publisher and fulfillment house information because there is a one-to-one correspondence between publisher and fulfillment house for a particular subscription, the two fields are included in the same level. Magazine identifying information, namely magazine ID and magazine title, are included in the second level. As shown, more than one magazine ID and magazine title correspond to each publisher and fulfillment house. Because there is one-to-one correspondence between magazine ID and magazine title, both fields are included together in the second level. Finally, the magazine term (e.g., in months) and the half basic rate of the magazine are included in the third level. To summarize the magazine information in the magazine database 248, each publisher utilizes a specific fulfillment house to fill orders for one or more magazine titles. Each magazine title corresponds to a unique magazine ID, which in turn corresponds to a term and half basic rate.

As can be seen from FIGS. 3A through 3D, the four databases are interrelated. Thus, by way of example, household 000 0001 includes Sandra Smith and Dick Smith. As identified in the Subscription Database 244, the household (by way of Sandra Smith) includes subscriptions 0000 0001 and FFFF FFFF. These subscriptions correspond to magazine ID's TIM 247 and SPI 126. These magazines ID's, in turn, correspond to particular entries in the Magazine Database 248. Additionally, add-on subscription 0000 0001 also corresponds to household 0000 0001. The details of the interrelation of these databases in described below.

Figure 4A:
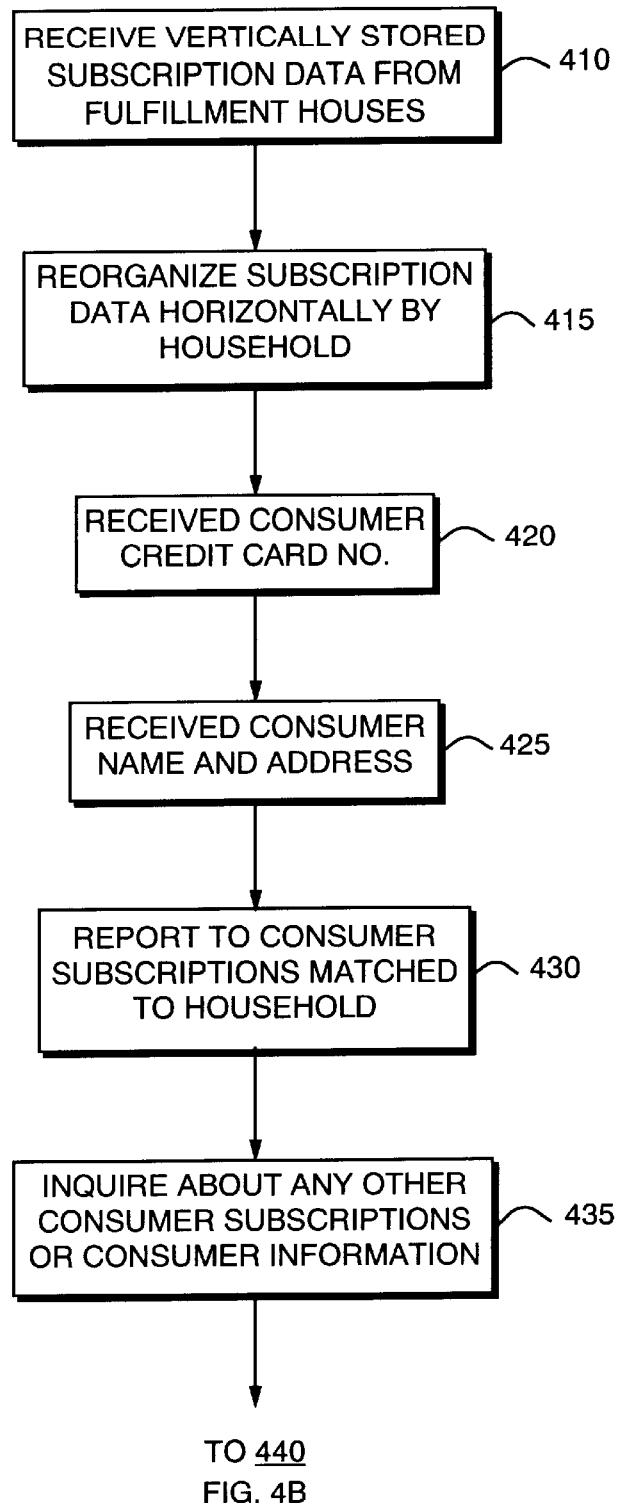
FIGS. 4A–4C show a flow chart of the overall operation of one embodiment of the present invention.
Figure 4B:
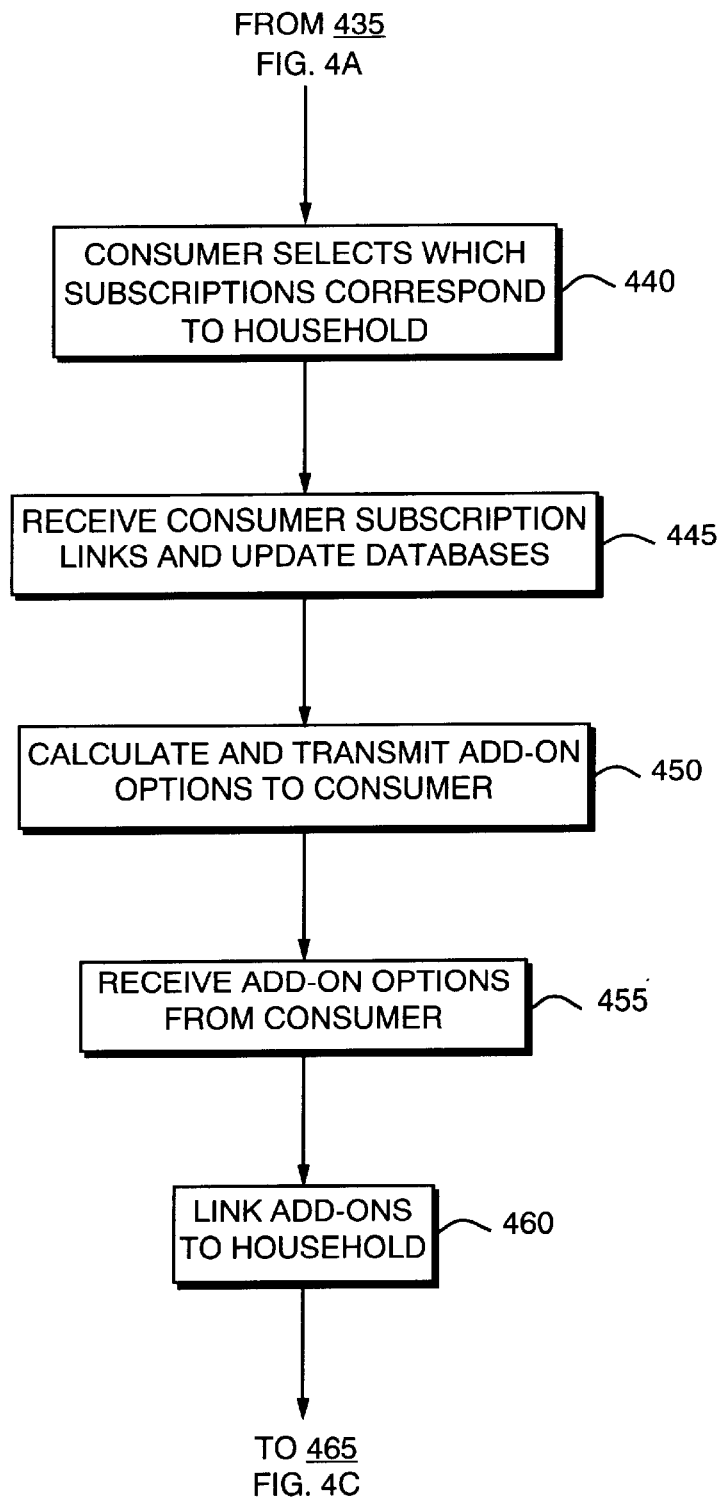

Having described the components of the present embodiment, the operation of the system 100 will now be described with referenced to FIGS. 4A–4B, 5, 6A–6B, and 7, and continuing reference to FIGS. 1, 2 and 3A–3B. Turning first to FIGS. 4A and 4B, the overall operation of the system 100 will now be described. As an initial step, with reference to FIG. 4A, the central agent 110 receives the vertically stored subscription data from the fulfillment houses (step 410). More specifically, the central agent 110 receives the subscription data from the fulfillment houses via the business to business and database maintenance gateway 282. Once subscription data is received, the central agent 110 reorganizes the data "horizontally", by household (step 415).

Having received and reorganized the subscription data, the central agent 110 is ready to interact with the consumers 130. Once a consumer 130 logs on to the website, the consumer 130 enters, and the central agent 110 receives, the consumer's credit card number (step 420), name, and address (step 425). It is to be appreciated that the consumer's credit card number is not used until later in the process; however, receiving the number as part of the consumer's initial interaction with the website associates a certain level of legitimacy with the consumer.

Having received the consumer information, the central agent 110 proceeds to determine and report to the consumer a list of subscriptions matched to the consumer's household (step 430). In order to report to the consumer 130 subscriptions that match her household, the search server 260 (or database server farm 240) compares the received consumer information to the consumer information in each record of the household database 242. Once the central agent 110 locates a record with matching consumer information, it notes the household ID and proceeds to locate each record in the subscription database having that same household ID. These records in the subscription database 244 are those corresponding to the consumer's household.

In the present embodiment, the central agent 110 segregates the matched subscriptions into 2 groups: likely matches and possible matches. The likely matches have a greater likelihood of corresponding to the consumer's household because the received consumer information (i.e., credit card number, name and address) more closely matches the corresponding subscription data searched. For example, likely matches are those instances where the apartment number, in addition to other consumer information, matches.

To ensure that all relevant subscriptions are accounted for, the presentation server form 220 presents an inquiry to the consumer requesting information on additional subscriptions that were not found as a result of the search and requesting additional consumer information that may be used to search for additional subscriptions (step 435). If applicable, the central agent 110 performs an additional search based on the received consumer information and reports any additional subscriptions to the consumer 130.

Once the consumer 130 is presented with all subscriptions possibly corresponding to the consumer's household, with reference to FIG. 4B, the consumer 130 selects which subscriptions correspond to her household (step 440). Moreover, the consumer 130 selects the subscriptions she wishes to link to the credit card number. If a consumer or household has more than one credit card number associated therewith, a central agent 110 requests that the consumer 130 select one credit card number to which the subscriptions will be linked and the appropriate charges applied. Thus, the central agent 110 receives the consumer's subscription links and updates the databases (step 445). More specifically, for each subscription that is linked to the credit card, the central agent 110 updates the linked field in the subscription database 244 to reflect that the subscription has been linked. Additionally, the central agent 110 updates the household ID field in each record of the subscription database 244 corresponding to a subscription identified as corresponding to the consumer's household.

As described to the consumer 130 on the web site, in the present embodiment, the agreement to link a subscription equates to an agreement to renew the subscription. Accordingly, as described with reference to FIG. 7, the consumer 130 will be billed automatically upon the normal expiration of the subscription. Furthermore, in the present embodiment, each consumer 130 will be automatically billed upon each successive expiration of each linked subscription until the consumer 130 affirmatively cancels the subscription. Such continuous service is described more fully in applicant's co-pending patent application Ser. No. 08/762,007, now U.S. Pat. No. 6,014,641, herein incorporated by reference.

Because each link equates to a promise to renew a subscription, the consumer 130 is in essence renewing several subscriptions at the same time. Consequently, the central agent 110 is able to calculate and transmit to the consumer 130 possible add-on subscription options (step 450). The steps of calculating and transmitting potential add-ons is described in greater detail with reference to FIGS. 6A and 6B.

As is explained to the consumer 130, the selected add-ons will be linked to the consumer's household (step 460). The consumer 130 will receive the add-ons for free until a specified expiration date, at which time the consumer will have cancelled the subscription or been automatically billed for the subscription. Like other linked subscriptions, the non-cancelled add-ons will also revert to the continuous service model described above.

Figure 4C:
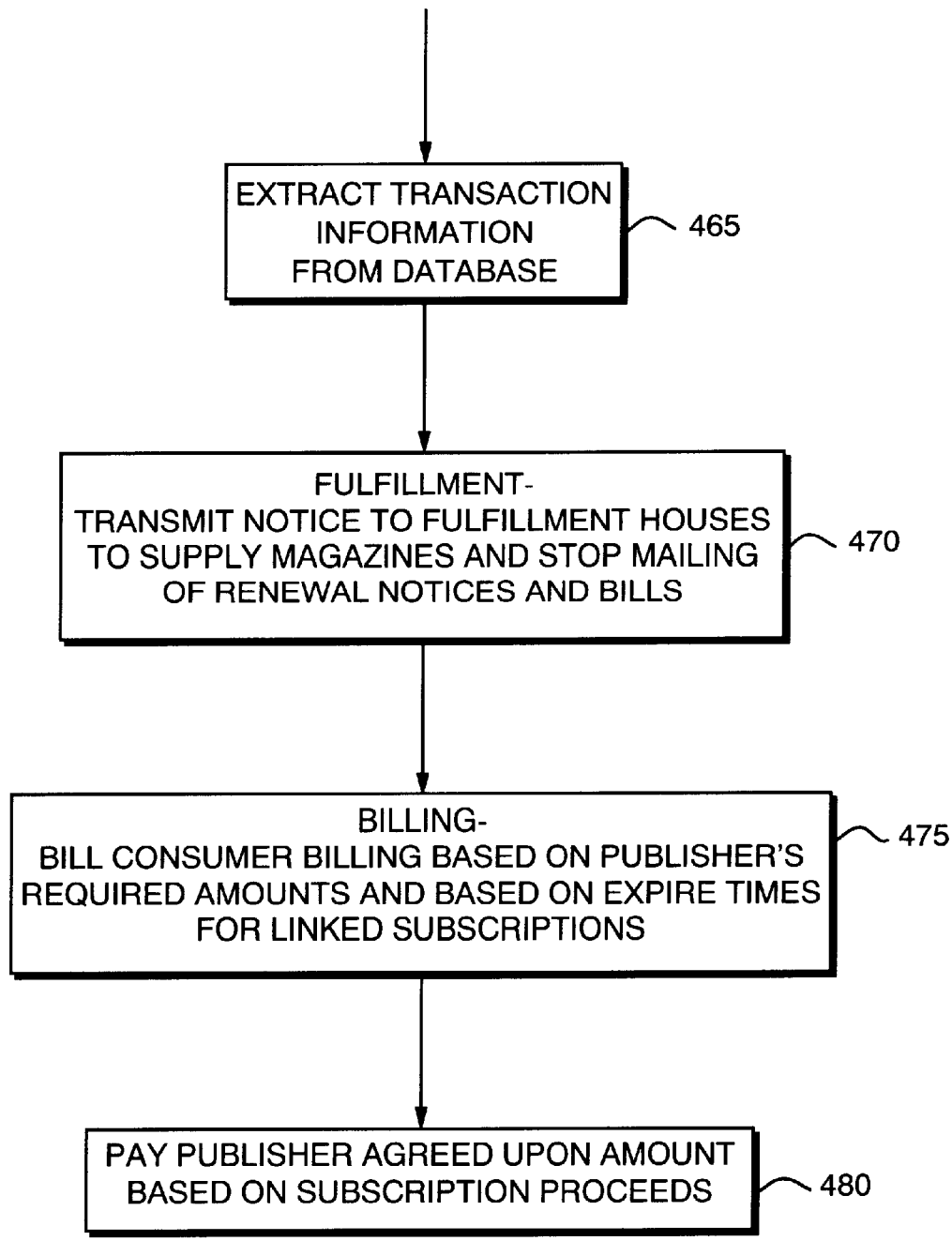

Once the consumer 130 has linked subscriptions and selected any available add-ons, with reference to FIG. 4C, the central agent 110 extracts transaction information from the databases (step 465). More specifically, the database server farm 240 extracts information concerning linked subscriptions and transmits it via the fulfillment and merchant processing gateway 282 to the enterprise server 286. This transaction information is used for both the fulfillment and billing of subscriptions.

Specifically, the central agent 110 effectuates fulfillment of the subscriptions by transmitting notices to the fulfillment houses 120 to supply magazines and to stop the mailing of renewal notices and bills (step 470). Additionally, the central agent 110 effectuates billing based on the required amounts and expiration dates for the linked subscriptions (step 475). The step of billing consumers is described in greater detail with reference to FIG. 7.

Finally, once the consumer 130 has been billed for the linked subscriptions, the central agent 110 remits payment to the publisher (step 480).

It is to be understood that the foregoing steps described in the general operation of the system 100 need not be performed in the particular order described. For example, it is to be understood that the initial steps of receiving subscription data and reorganizing it occurs periodically, for example once every month. The interaction between the central agent 110 and the consumer 130, on the other hand, happens much more frequently, essentially every time a consumer 130 accesses the website. Furthermore, the steps of extracting transaction information and effectuating fulfillment, billing and publisher remit occur periodically, for example, once every month or once everyday.

Furthermore, each individual step described need not be performed in the exact order shown. For example, the consumer information may be received in any order, and the consumer may select which subscriptions correspond to her household prior to being asked for other household subscriptions.

In other alternate embodiments, subscription information is organized at different times in the overall process. For example, in one embodiment, the subscription information is organized by household in real-time, when the consumer 130 access the website. In such an embodiment, the consumer 130 enters the consumer information and then the central agent 110 queries the fulfillment houses 120 for subscription information corresponding to the received consumer information. In yet another embodiment, the central agent 110 receives from the fulfillment houses 120 the subscription information, stores the information, and organizes the information by household on a consumer-by-consumer basis. In other words, only upon receiving a consumer inquiry will the central agent 110 associate or organize subscriptions from the inquiring consumer's household.

Figure 5:
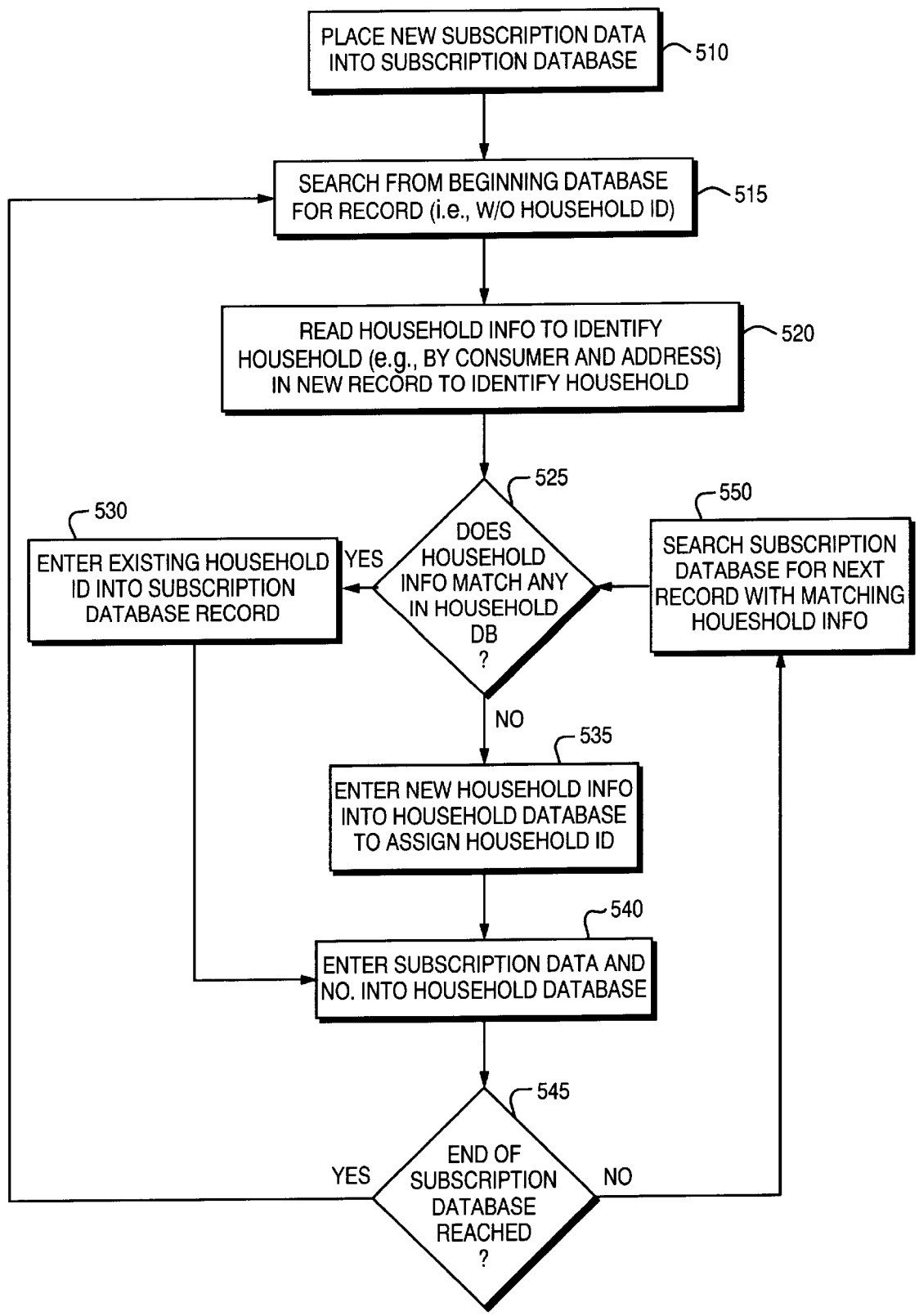
FIG. 5 is a flow chart illustrating the function of householding of one embodiment of the present invention.

The step of reorganizing the subscription data horizontally by household will now be described in greater detail with reference to FIG. 5. Initially, the subscription data received from a fulfillment house 120 must be placed into the subscription database 246 (step 510). It is to be understood that this operation may require a filtering or normalization of the received data in order to place the subscription data received from the various fulfillment houses into the same format.

Once the subscription data is received, the central agent 110 begins searching each record in the subscription database 244 for the first record without a household ID (step 515). As will become apparent, any record in the database 244 without a household ID is a newly received record. The central agent 110 then proceeds to read the household information to identify the household (step 520).

Once the household information of the newly received record has been read, central agent 110 proceeds to determine whether or not that same household information is already contained within the household database 242 (step 525). If the household information already exists, then a household ID has already been assigned to that household. Accordingly, that household ID is entered into the subscription database record (step 530).

If the newly received household information does not match the household information already contained in the household database 242, then the household information is entered in the next available record in the household database 242, thereby assigning the next available household ID number (step 535). Once the appropriate household ID has been determined for the new subscription data (step 540), central agent 110 proceeds to enter the household ID into the subscription database (step 540).

The central agent 110 then determines whether or not it has reached the end of the subscription database (step 545). If the end of the subscription database 244 has been reached, then the central agent 110 begins searching for the next record in the subscription database not having a household ID (step 515).

On the other hand, if the end of the subscription database 244 has not been reached, then the central agent 110 continues searching the subscription database for the next record with matching household information (step 550). This process continues until the central agent 110 searches the entirety of the subscription database 244, assigning a household ID to each record.

It is to be understood that the present invention is not limited to the foregoing series of acts organizing the subscription information by household. Other series of acts may be used. For example, once a new record is assigned a household ID, the remaining new records could be searched for the same household. In one alternate embodiment, household ID's could be assigned to new records, one-at-a-time, as each is received by the central agent 110. One example of householding software includes that sold under the trademark DYNAWATCHO® by DynaMark$^{SM}$.

Figure 6A:
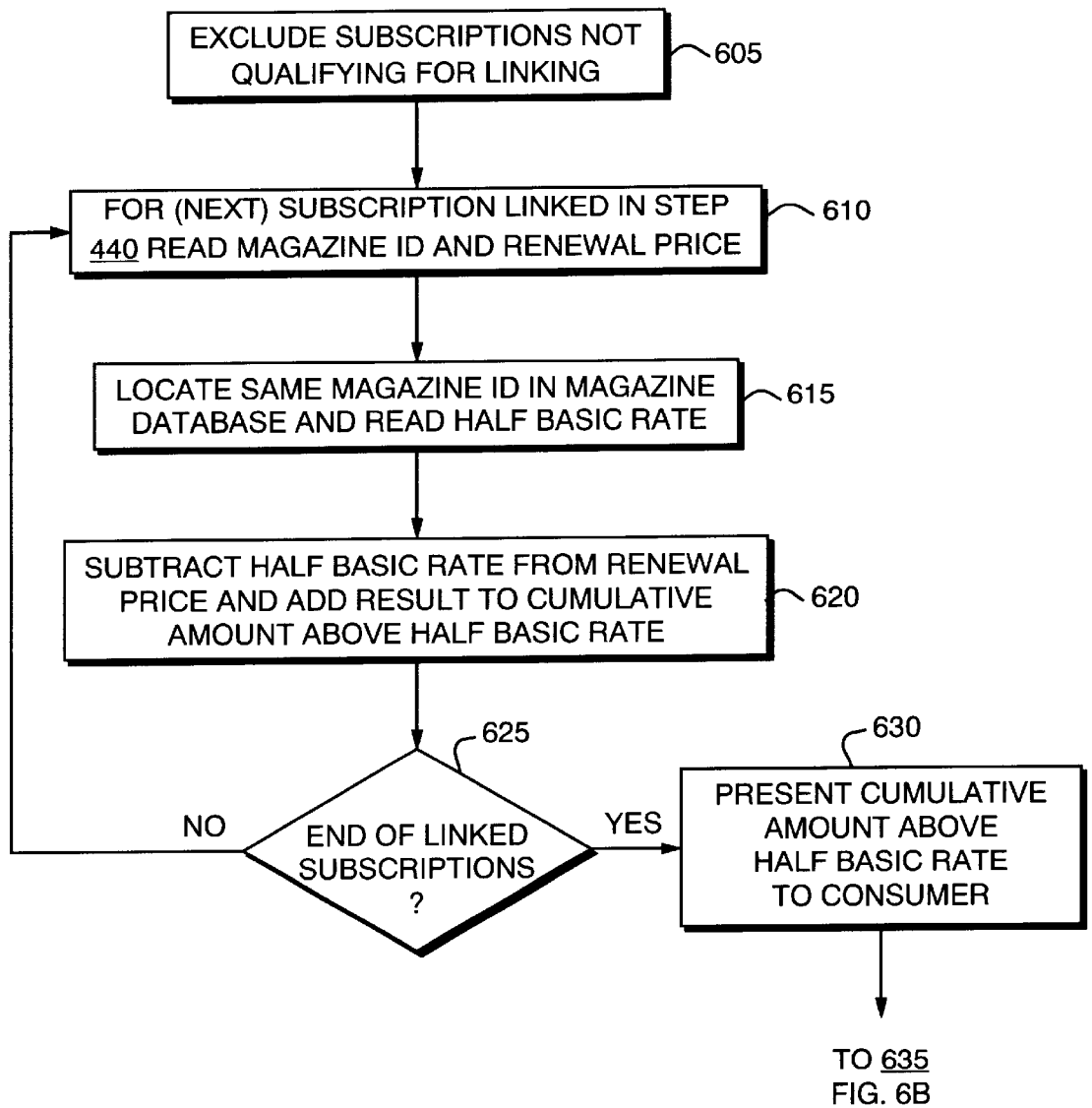
FIGS. 6A–6B show a flow chart illustrating the function of providing add-on subscriptions according to one embodiment of the present invention.
Figure 6B:
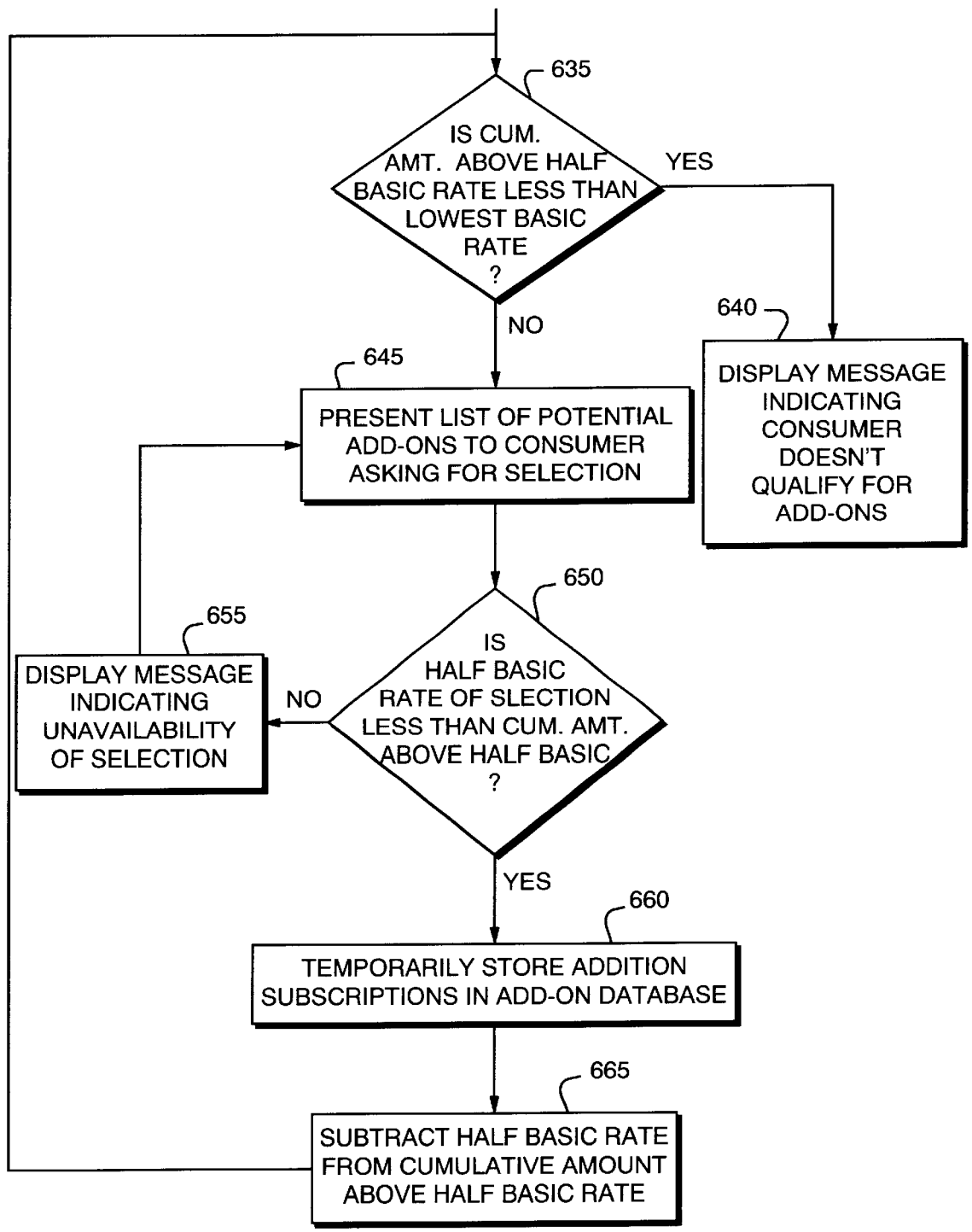

The process of linking subscriptions and calculating and transmitting add-on options to the consumer 130 will now be described with reference to FIGS. 6A and 6B. In the present embodiment, the first step in allowing the consumer 130 linked subscriptions is excluding or preventing the consumer from linking subscriptions that do not qualify (step 605). For example, in the present embodiment, subscriptions having an origination date earlier than a specified date are not entitled to being linked. Additionally, those subscriptions made through a specified channel of sale (as indicated in the subscription database 244), such as a low quality PDS, do not qualify for linking.

It is to be understood that other criteria may be used for determining whether or not a subscription qualifies for linking. For example, in an alternate embodiment, subscriptions which have been renewed through other sources more than a given number of times are not qualified for linking. In general, a subscription may be excluded from linking based on its time on file.

For the first subscription actually linked, the central agent 110 reads the magazine ID and the future price from the corresponding record in the subscription database 244 (step 610). Central agent 110 then proceeds to locate the same magazine ID in the magazine database 248 and read the corresponding half basic rate (step 615).

The central agent 110 subtracts the half basic rate from the future price, thereby calculating the amount committed by the consumer in excess of the half basic rate. This result is added to a cumulative amount above half basic rate for the consumer (step 620). This cumulative amount above half basic rate is temporarily stored in memory in any one of the components of the central agent 110.

The central agent 110 then determines whether there are other linked subscriptions (step 625). If other linked subscriptions exist, then the central agent 110 repeats 110 the four mentioned steps to continue adding to the cumulative amount above half basic rate.

On the other hand, if there are no more linked subscriptions, then the central agent 110 presents the cumulative amount above half basic rate to the consumer 130 (step 630). This amount represents the dollar figure to be applied to receiving free ad-on subscriptions.

In order to determine what add-on subscriptions may be offered to the consumer 130, the central agent determines whether or not the cumulative amount above half basic rate is less than the lowest half basic rate of all potential add-ons (step 635). If the cumulative amount is less than the lowest individual half basic rate, then the central agent 110 displays the message indicating to the consumer 130 that she does not qualify for any add-ons (step 640). If the cumulative amount is not less than the lowest half basic rate, then a consumer has enough credits to be applied to potential add-ons.

Therefore, the central agent 110 presents a list of potential add-ons to the consumer 130 and requests the consumer's selection (step 645). Central agent 110 then determines whether or not the half basic rate of the consumer's selection is less than the cumulative amount of both half basic rate (step 650). By performing this operation, the central agent 110 is determining whether or not the consumer 130 has enough credits to receive the selection. If the half basic rate of the selection is not less than the consumer's cumulative amount above half basic, then the central agent 110 displays a message indicating the unavailability of the selection (step 655). The central agent 110 then presents the list of potential add-ons to the consumer 130 yet another time asking for a different selection (step 645).

If the half basic rate of the consumer's original selection is less than the cumulative amount above half basic, then the consumer 130 is entitled to receive the selection. Thus, the central agent 110 temporarily stores the add-on subscription information in the add-on database 246 (step 660). The awarded add-on subscription is not stored in the subscription database 244 in the present embodiment because doing so would result in a duplicative entry in the subscription database 244 once the new subscription data was received from the fulfillment houses 120.

Once the add-on subscription has been awarded, the central agent 110 subtracts the half basic rate of the selected subscription from the cumulative amount above half basic rate (step 665). Having subtracted the half basic rate, the consumer's cumulative amount above half basic rate reflects the current amount of credit able to be applied to add-ons. Therefore, the central agent 110 continues to determine the availability of add-ons based on this updated cumulative amount above half basic rate (step 635). The central agent 110 continues to award add-on subscriptions until the consumer's cumulative above half basic rate is less than the lowest half basic rate of the potential add-on subscriptions.

In an alternate embodiment, the subscription database 244 does not include a link field. Instead, a separate database includes the subscription data associated with each linked subscription. In one embodiment, the same database includes subscription data of both linked subscriptions and add-on subscriptions. The central agent would sweep the contents of such databases and effectuate fulfillment of the relevant subscriptions.

Figure 7:
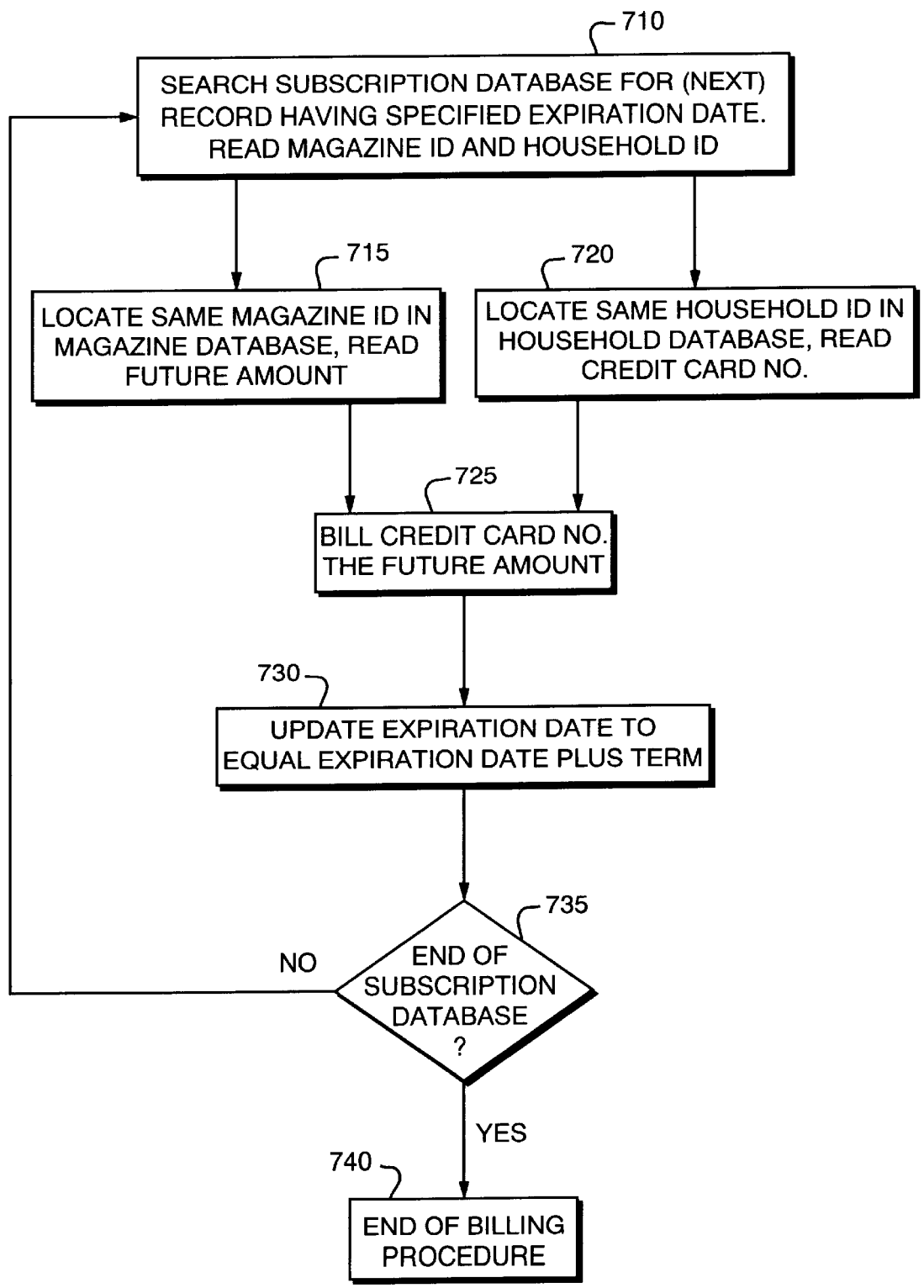
FIG. 7 is a flow chart illustrating the process of billing a consumer according to one embodiment of the present invention.

The billing process of the system 100 will now be described in greater detail with reference to FIG. 7. In one embodiment this billing process is effectuated by the database server farm 240, search server 260 and the enterprise server 286. The initial step in the billing process is the search of the subscription database 244 for a record having a specified expiration date (step 710). The expiration date in the present embodiment is a specific date, and the billing is initiated a set time period away from the date the search is being run. For example, a typical search may involve locating the records in the subscription database 244 having an expiration date 45 days in the future. In an alternate embodiment, the central agent 110 searches the database for records having an expiration date within a certain range. Once a record having a specified expiration date, the database server 240 reads the magazine ID and household ID from the record. With this information, the central agent 110 proceeds to locate the same magazine ID in the magazine database 248 and reads the future price (step 715). The central agent 110 also proceeds to locate the same household ID in the household database 242 and reads the credit card number linked to the household's subscriptions (step 720).

It is to be understood that since the databases in the present embodiment are relational, the searches of the magazine database 248 and household database 242 occur essentially at the same time. In alternate embodiments, however, the two searches may be performed in any order. Once the central agent 110 identifies the relevant furture price and credit card number, the enterprise server 286 proceeds to bill the credit card number the future price (step 725).

The central agent 110 then updates the expiration date field in the subscription database 244 to equal the current expiration date plus the relevant magazine term (step 730).

The central agent 110 then determines whether the search has reached the end of the subscription database (step 735). If the end of the database has not been reached, then the central agent 110 continues to search the subscription database 244 for the next record having the specified expiration data (step 710). As such, the billing process repeats until the end of the subscription database 244 is reached. Once the end of the database is reached, the central agent 110 recognizes that the billing procedure has ended (step 740).

As with the other processes described herein, it is to be understood that alterations may be made to the process while keeping within the scope of the present invention. For example, the step of updating the expiration date to equal to expiration date plus the term of the magazine subscription may be performed immediately after the relevant record in the subscription database 244 has been located. Moreover, it is within the scope of the present invention to provide different levels of information to the enterprise server 286. For example, in the present embodiment, only the information corresponding to records having the specified expiration date is sent via the fulfillment and merchant gateway 282 to the enterprise 286. In an alternate embodiment, a set of records or all records in the entire subscription database 244 may be transferred to the enterprise 286. In such an embodiment, the enterprise server 286 itself performs the search for records having the specified expiration date.

In another alternate embodiment, an account other than a credit card account is charged for the subscriptions. In such an embodiment, an account identifier, instead of a credit card number, is stored in the household database 242 and accessed during billing. Payment may be made by debiting a checking account, effectuating an electronic transfer of money, using digital money, and the like, and account identifier may include bank and/or account number.

Figure 8:
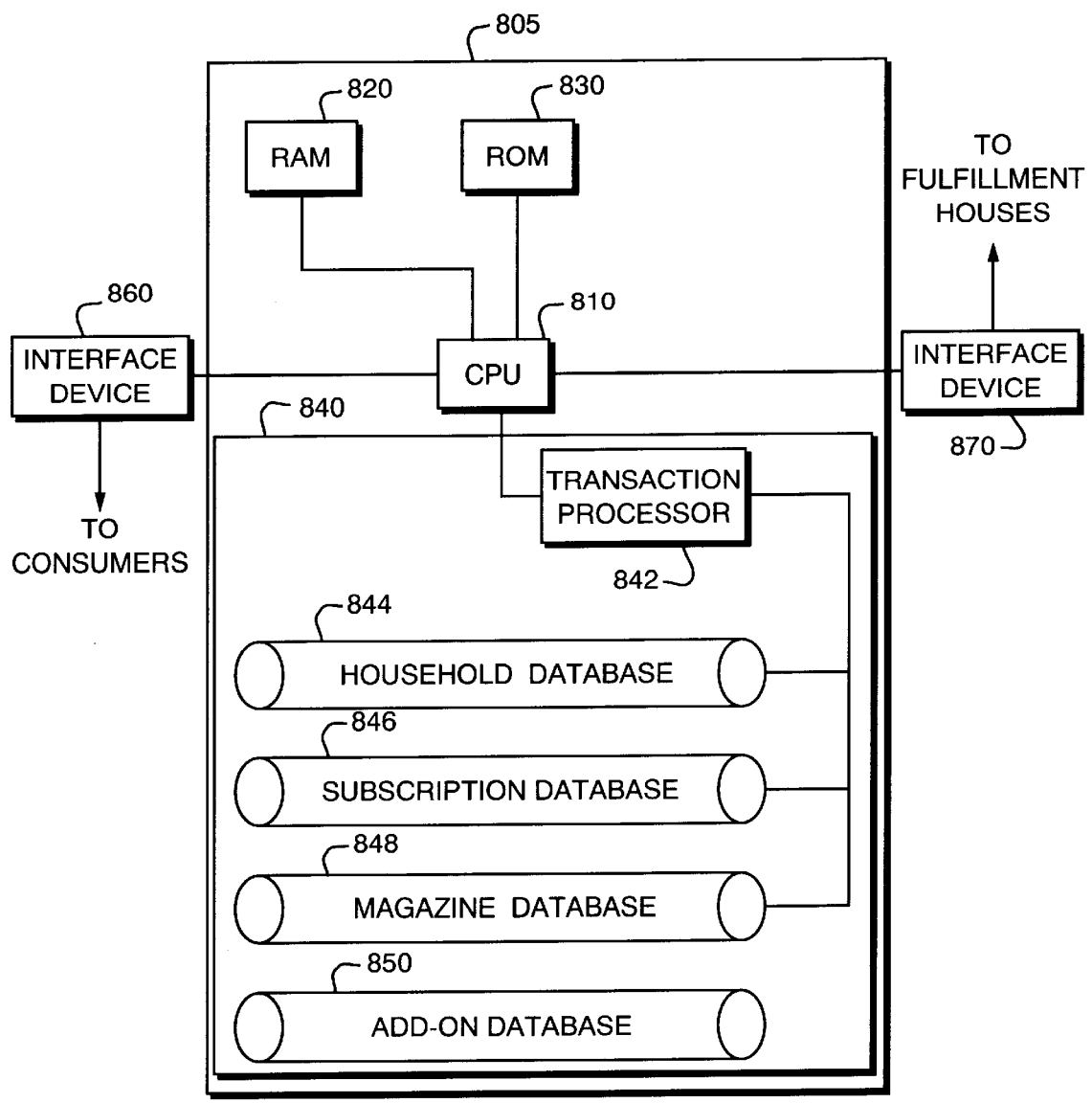
FIG. 8 is a schematic of a central agent according to one embodiment of the present invention.

FIG. 8 illustrates an alternate embodiment of the central agent 110. As shown in FIG. 8, the central agent 805 includes Central Processing Unit (CPU) 810, Random Access Memory (RAM) 820, Read-Only Memory (ROM) 830, large capacity storage device 840, and two interface devices 860, 870. As such, the central agent 805 may take the form of any commercially available server.

CPU 810 executes program code stored in one or more RAM 820, ROM 830, and storage device 840 to carry out the functions and acts described above in connection with FIGS. 4A–4C, 5, 6A–6B and 7. CPU 810 preferably comprises at least one high-speed digital data processor, such as those sold under the trademark INTEL PENTIUM. CPU 810 also interacts with the interface devices 860, 870 to communicate with consumers and fulfillment houses. CPU 810 interacts with RAM 820, ROM 830, storage device 840 and interface device 860, 870 according to conventional processing and computing techniques.

Storage device 840 contains a transaction processor 842 to household database 844, subscription database 846, magazine database 848 and add-on database 850. The transaction processor 842 maintains, calculates, and accesses data stored in the databases and generates fulfillment and billing records, as described above in connection with FIGS. 4A–4C, 5, 6A–6B and 7. Preferably, transaction processor 842 encrypts data before transmission according to conventional encryption techniques. Furthermore, transaction processor 842 comprises a separate conventional CPU/microprocessor such as those sold under the trademark INETL PENTIUM. In an alternate embodiment, transaction processor 842 comprises a portion of 810. The contents of the databases is essentially that as described above to FIGS. 3A–3D.

In alternate embodiments, the interface devices 860, 870 comprise data input devices, digital data processing terminals, voice recognition units, network interfaces, modems, and the like. Data received via the interface devices 860, 870 is passed to the CPU 810. The CPU 810, in turn, performs operations on the data and, if necessary, transfers it to the data storage device 840.

Organizing and associating consumer's subscription by household allows for efficient management of a household's magazine portfolio. In one embodiment, the central agent 110, via the presentation server farm 220, permits a consumer 130 to access the website, enter identifying consumer information, such as credit card number, name and address, household ID (if previously made available), or password associated with the household (if previously made available), and make changes to household subscription data. As such, a consumer 130 can access all household subscriptions at one time based on one identification, and the consumer 130 can essentially simultaneously make changes to all household subscriptions.

Specifically, a consumer 130 enters identifying consumer information, and the central agent 110 performs a search to retrieve all subscriptions associated with the consumer's household. In response to prompts from the website GUI, the consumer 130 makes any number of changes including: changing credit card numbers; canceling a subscription, add new subscriptions, change address across all subscriptions, and the like. For example, when the consumer 130 wishes to change her address, she simply enters the new address. The central agent 110 updates the address in the household database 242 (and preferably in each subscription record) and communicates the new address to all relevant fulfillment houses 120.

One embodiment according to the present invention includes an added level of security to ensure that no consumer can access or alter another consumer's subscription. In such an embodiment, the central agent receives a consumer's selection for linked accounts and addons as described above. However, prior to effectuating the linking of subscriptions, the central agent generates a password associated with the consumer. The password is then mailed to the consumer at the address specified by subscription data. The consumer must then visit the web site and use the password to confirm and effectuate the linking of subscriptions. Additionally, the password is necessary for effectuating certain consumer service operations, such as cancellation of a subscription. Although not necessary to the implementation of the present invention, such security measures helps prevent fraud and ensures a pleasant consumer experience. It also to be understood that use of the password is but one of many known security measures that may be implemented in accord with present invention.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method of consolidating subscriptions comprising:
   receiving from one or more fulfillment houses subscription information corresponding to subscriptions;
   organizing the subscription information by consumer household;
   receiving consumer information from a consumer of a household;
   matching the consumer information with subscription information associated with the consumer's household;
   presenting to the consumer subscription information matching the received consumer information;
   receiving from the consumer an indication of selected subscriptions; and
   linking a number of the selected subscriptions to the received consumer information.

2. The method of claim 1 wherein the consumer information is a credit card number.

3. The method of claim 1 wherein the consumer information is consumer name and address.

4. The method of claim 1 wherein the consumer information includes a first credit card number and a second credit card number and wherein the subscription information is matched to the first credit card number.

5. The method of claim 1 wherein the received consumer information includes an identifier of an account and the number of subscriptions are linked to the account identifier, the method further comprising charging the account for the linked subscriptions.

6. The method of claim 1 wherein all of the subscriptions corresponding to the selected subscription information are linked to the received consumer information.

7. The method of claim 1 further comprising:
   transmitting renewal notices to the consumer and receiving consumer renewal responses; and
   providing add-on subscriptions based on consumer renewal responses.

8. The method of claim 1 further comprising:
   selectively preventing linking of a subscription.

9. The method of claim 1 further comprising:
   providing the consumer a number of add-on subscriptions based on the linked subscriptions.

10. The method of claim 9 wherein the number of add-on subscriptions is based on the number of linked subscriptions.

11. The method of claim 9 wherein the add-on subscriptions have associated half basic rates and the providing is based on the total of the half basic rates of the add-on subscriptions.

12. The method of claim 9 further comprising billing the consumer for an add-on subscription based on the consumer failing to cancel that add-on subscription.

13. The method of claim 9 wherein the number of add-on subscriptions is based on an amount paid by the consumer for the linked subscriptions and half basic rates of linked subscriptions.

14. The method of claim 13 further comprising:
   for individual linked subscriptions, calculating an individual subscription add-on value by subtracting the half basic rate from the amount paid; and
   calculating a total add-on value by summing the individual add-on values of the linked subscriptions,
   wherein providing the add-on subscriptions is based on the total add-on value.

15. A method of consolidating subscriptions comprising:
   receiving from one or more fulfillment houses subscription information corresponding to subscriptions;
   organizing the subscription information by consumer household, wherein the subscription information includes subscription expiration date;
   linking the organized subscription information to an account; and
   automatically billing the account for subscriptions corresponding to the linked subscription information based on the expiration date.

16. A method of consolidating subscriptions comprising:
   receiving from one or more fulfillment houses subscription information corresponding to subscriptions;
   organizing the subscription information by consumer household;
   receiving consumer information from a consumer of a household;
   matching the consumer information with subscription information associated with the consumer's household;
   receiving a consumer edit to the subscription information associated with the consumer's household; and
   updating the subscription information associated with the consumer's household according to the consumer edits.

17. The method of claim 16 wherein the consumer edit is applied to subscription information corresponding to multiple subscriptions.

18. The method of claim 16 wherein receiving the consumer edit includes receiving at least one of the following edits: cancellation, change of address, change of the credit card number, new purchase, and purchase of gift subscription.

19. A system for consolidating subscriptions, comprising:
   a storage device to store information relating to subscriptions, wherein said subscription information is received from one or more fulfillment houses, and wherein the subscription information includes at least one subscription expiration date; and
   one or more processors coupled to the storage device, wherein the processors are configured to organize the subscription information by household; to associate information relating to subscriptions with a household of a consumer based on consumer information, wherein the consumer information includes an identifier of an account; to initiate billing the consumer for subscriptions associated with the consumer's household by charging the account; and to bill the consumer for the subscriptions based on the at least one subscription expiration date.

20. The system of claim 19 wherein the consumer information is received from the consumer.

21. The system of claim 19 wherein the consumer information is part of the information received from the fulfillment houses.

22. A system for consolidating subscriptions, comprising:
   a storage device to store information relating to subscriptions, the information received from one or more fulfillment houses; and one or more processors coupled to the storage device, wherein the processors are configured to organize the subscription information by household and to determine the availability of add-on subscriptions.

23. A method of managing a magazine portfolio, the method comprising:

receiving subscription information relating to a plurality of subscriptions associated with a consumer of a household;

providing a consumer identifier;

selecting at least a portion of the plurality of the subscriptions for linking to the consumer identifier, wherein selecting subscriptions for linking to the consumer identifier is an agreement to renew the selected subscriptions and wherein the selected subscriptions were purchased from different sources; and receiving one or more add-on subscriptions based on the selected subscriptions.

24. The method of claim 23 wherein the consumer identifier is an identifier of an account.

25. A method of managing a magazine portfolio, the method comprising:

receiving subscription information relating to a plurality of subscriptions associated with a consumer of a household;

providing a consumer identifier;

selecting at least a portion of the plurality of the subscriptions for linking to the consumer identifier;

providing the consumer identifier a second time;

receiving the subscription information relating to the plurality of subscriptions associated with the consumer; and editing the subscription information, wherein the subscription information relates to subscriptions purchased from different sources.

* * * * *